Aug. 13, 1940.  J. W. FITZ GERALD  2,211,108

DYNAMOMETER

Filed Aug. 15, 1938

Inventor;
John W. FitzGerald
By Ina Mutton Jones
Attorney

Patented Aug. 13, 1940

2,211,108

UNITED STATES PATENT OFFICE 2,211,108

DYNAMOMETER

John W. Fitz Gerald, Milwaukee, Wis., assignor to Briggs & Stratton Corporation, Milwaukee, Wis., a corporation of Delaware Application August 15, 1938, Serial No. 225,066

9 Claims. (Cl. 265—24)

This invention relates to dynamometers for testing and "working-in" internal combustion engines.

One of the objects of this invention is to provide a dynamometer which is so designed that the energy developed by the engine being tested can be dissipated by running it back into the supply lines with which the motor-generator of the dynamometer is connected so as to obviate the need for extraneous energy dissipating devices.

Another object of this invention is to provide means whereby, in the event the engine fails for any reason whatsoever, as for instance depletion of its fuel supply, the motor-generator is cut off from the supply lines so as to preclude the possibility of harmful continued operation of the engine by the motor-generator.

A further object of this invention is to embody the two above-mentioned features in a simple practical and commercially feasible construction.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

Figure 1:
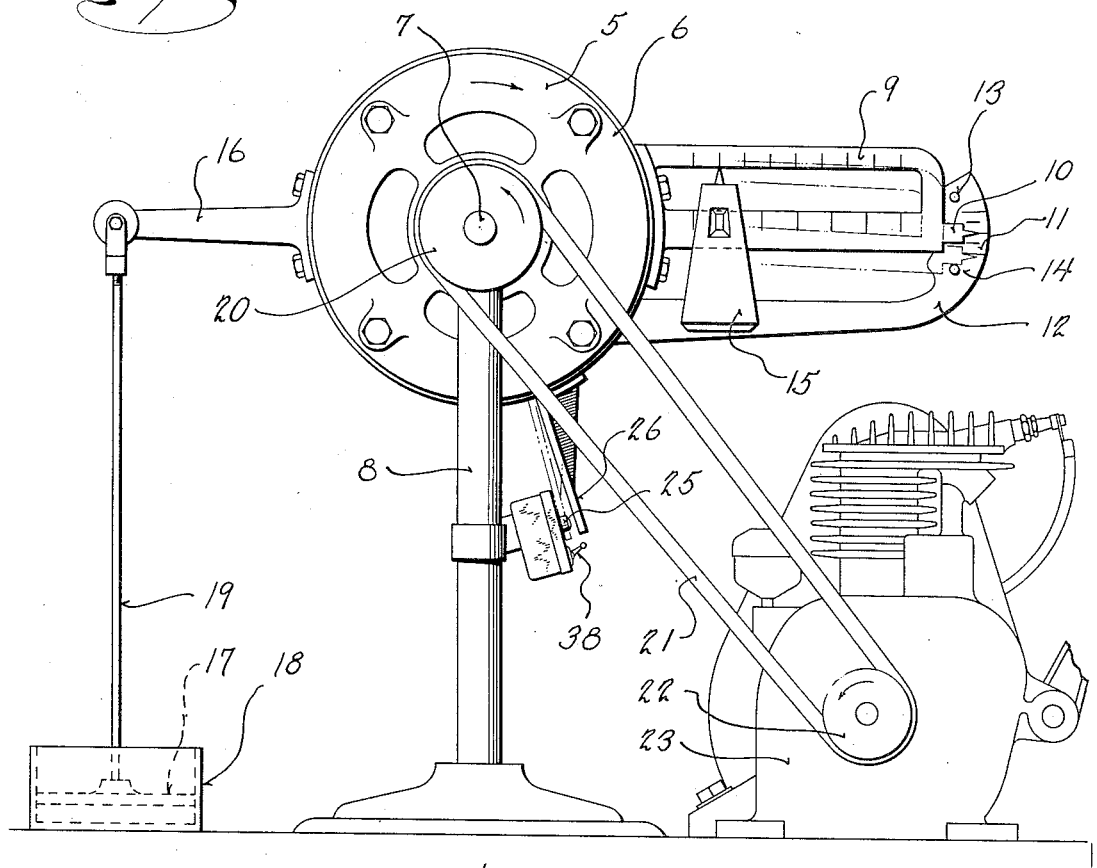
Figure 2:
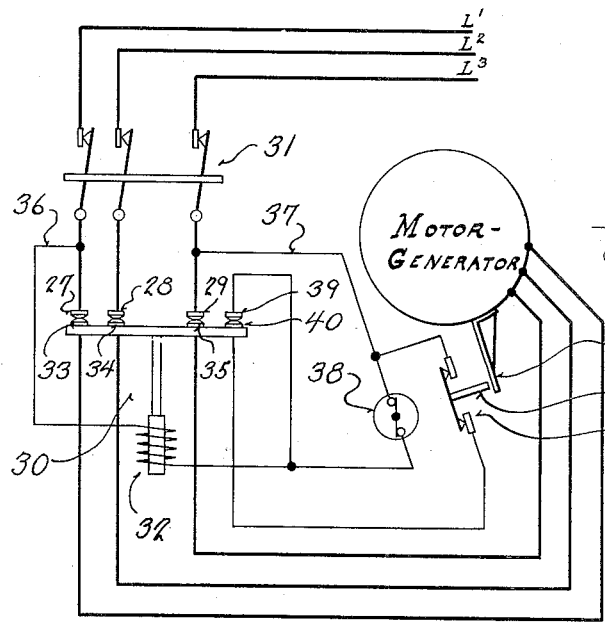

The accompanying drawing illustrates one complete example of the physical embodiment of the invention constructed in accordance with the best mode so far devised for the practical application of the principles thereof, and in which:

Figure 1 is a side view of a dynamometer constructed in accordance with this invention, illustrating its manner of use; and Figure 2 is a wiring diagram showing the electrical connections thereof.

Referring now particularly to the accompanying drawing in which like numerals indicate like parts, the numeral 5 designates a motor-generator of conventional design equipped with the customary stator 6 and rotor 7. The motor-generator is mounted on a pedestal 8 in a manner permitting bodily oscillation thereof on the axis of its rotor, which is arranged horizontally.

Secured to the stator 6 and extending laterally from one side thereof is a scale beam 9 having a pointer 10 on its outer end cooperating with a scale 11 carried on the outer end of an arm 12 fixed to the stationary supporting column in any suitable manner. Stops 13 and 14 disposed above and beneath the pointer 10 cooperate therewith to limit the oscillation of the motor-generator stator, and a weight 15 slidably mounted on the beam 9 provides adjustable opposition to counterclockwise oscillation of the motor-generator stator.

Extending laterally from the opposite side of the stator is an arm 16, the outer end of which is connected to the plunger 17 of a dashpot 18 through the medium of a link 19. The dashpot serves to dampen oscillatory movement of the motor-generator stator.

The rotor 7 has a pulley 20 fixed thereto which is drivingly connected through a belt 21, or other suitable power transmitting device, with the drive shaft 22 of the engine 23 being tested. Hence, it is possible for the motor-generator to drive the engine and for the engine to drive the motor-generator.

In using the dynamometer to "work-in" and test an engine, the engine is connected with the dynamometer in the manner shown and described, and then the motor-generator is started by connecting it with its supply lines to run the engine "free" for a period of time to permit its parts to "work-in." After a predetermined period of such operation, the engine is actively started to operate under its own power. The engine thus becomes the driving force and the motor-generator the driven element or load, for the engine is run at a speed in excess of synchronism.

During the first period of operation, that is, when the engine is being driven from the motor-generator, the reactive torque between the rotor and stator of the motor-generator tends to turn the stator in a clockwise direction so that the scale beam 9 is in its lowermost dotted line position shown in Figure 1, but when the engine becomes the driving force, the influence of the reactive torque is modified to the extent that the scale beam 9 rises in proportion to the speed of the engine an amount dependent upon the setting of the weight 15. In this manner, the horsepower rating of the engine is obtained.

When the engine drives the motor-generator, the motor-generator acting as a generator applies a load on the engine, and being connected with its supply lines, the energy developed in this manner is conveniently dissipated by being conducted out onto the supply lines; but inasmuch as the motor-generator is connected with its supply lines, it is apparent that unless some means is provided for disconnecting the same. any failure of the engine, such as depletion of its fuel supply, would result in continued running of the engine from the motor-generator as the driving power, which obviously is objectionable.

Means are therefore provided to automatically disconnect the motor-generator from its supply lines in the event of such failure of the engine, or even in the event the speed of the engine is reduced by any cause whatsoever below that necessary to hold the beam 9 in a raised position.

This means consists primarily of a normally closed switch 24 having an actuator 25 positioned to be engaged by an arm 26 fixed to the stator of the motor-generator. The relative positions of the switch and the arm 26 are such that when the motor-generator stator turns clockwise and its beam 9 descends, the arm 26 presses against the actuator 25 and opens the switch 24, and inasmuch as the switch 24 is connected with the starting circuit of the motor-generator in such a manner that closure thereof is necessary to maintain the motor-generator connected with its supply lines, it follows that the opening of the switch automatically disconnects the motor-generator from the supply lines.

The actual circuit connections by which the motor-generator is connected with the supply lines are illustrated in Figure 2. As here shown, lines $L^1$, $L^2$ and $L^3$ are connected with terminals 27, 28 and 29, respectively, of a line starter switch, indicated generally by the numeral 30, through a manually closed switch 31. The line starter switch 30 has a solenoid 32, which upon being energized closes the starter switch 30 to connect its movable contacts 33, 34 and 35 with the contacts 27, 28 and 29, respectively.

The energizing circuit for the solenoid 32 comprises a conductor 36 connected with line $L^1$ and a conductor 37 connected with line $L^3$, both of said conductors terminating at the ends of the solenoid, and the conductor 37 having interposed therein, a manually operable toggle switch 38. Hence, upon closure of the toggle switch 38, assuming that the main switch 31 is closed, the coil 32 is energized and the starter switch 30 closes to connect the motor-generator across the lines $L^1$, $L^2$ and $L^3$.

With the closure of the starter switch, a holding switch comprising contacts 39 and 40 closes. This holding switch is in parallel with the toggle switch 38, but also in series with the switch 24, as can be readily traced in Figure 2.

If, after the switch 24 has been closed as a result of the engine becoming the driving force and oscillating the stator of the motor-generator so that its scale beam lifts and its arm 26 moves away from the switch actuator 25, opening of the toggle switch 38, which should be done when the engine becomes the driving force, does not disturb the connection of the motor-generator with its supply lines, but as will be readily apparent, this connection is dependent upon the continued closure of the switch 24. As soon as this switch is opened, as described hereinbefore, by clockwise rotation of the motor-generator stator, the motor-generator is promptly disconnected from its lines.

From the foregoing description taken in connection with the accompanying drawing, it will be readily apparent to those skilled in the art, that this invention provides an important safety factor for dynamometers used in the testing and "working-in" of internal combustion engines, and that it likewise effects considerable saving in eliminating the necessity for extraneous energy dissipating expedients.

What I claim as my invention is:

1. A dynamometer for testing internal combustion engines comprising: a motor-generator; a support mounting the motor-generator with its rotor axis horizontal and in a manner permitting bodily oscillation of the motor-generator about its rotor axis; means for connecting the rotor of the motor-generator with an internal combustion engine to be tested; an electric switch controlling the connection of the motor-generator with a supply line; and means operable by bodily oscillation of the motor-generator about its axis in one direction which occurs when the speed of the engine drops below a predetermined value for opening said switch to disconnect the motor-generator from the supply line.

2. In a dynamometer for testing internal combustion engines, the combination of: a motor-generator having a stator and a rotor; means mounting the motor-generator for bodily oscillation about the axis of its rotor, whereby the torque between the rotor and stator while the motor-generator is connected with a source of electrical energy tends to turn the stator in one direction; means for connecting the rotor with an engine to be tested in a manner whereby the engine is capable of driving the rotor at a speed above synchronism so that the torque between the rotor and stator tending to turn the stator in said direction is offset and the stator tends to turn in the other direction; and an electric switch controlled by such oscillatory movement of the stator for disconnecting the motor-generator from the source of electrical energy whenever the effect of the torque between the rotor and the stator exceeds the influence of the torque between the engine and the rotor.

3. In combination: a motor-generator; means mounting the motor-generator for bodily oscillation about the axis of its rotor; an internal combustion engine; a driving connection between the crankshaft of the internal combustion engine and the rotor of the motor-generator so that the engine may be driven from the motor-generator and vice versa, said freedom of the motor-generator to oscillate bodily on the axis of its rotor enabling the stator of the motor-generator to move in one direction or the other depending upon whether the motor-generator or the engine constitutes the driving force; an electric switch for controlling the connection of the motor-generator with supply lines; and means operable upon oscillation of the motor-generator stator which occurs when the engine ceases to drive the motor-generator for opening said switch to disconnect the motor-generator from the supply lines.

4. A dynamometer of the character described comprising: a motor-generator having a stator and a rotor; a support for the motor-generator enabling bodily oscillation thereof on the axis of its rotor; a weighted beam connected to the stator and tending to turn the same in one direction; means for drivingly connecting the rotor with a power unit to be tested in such a manner that the rotor is driven thereby in a direction causing the stator to turn against the restraint of said weighted beam so that the extent of such rotation can be utilized to determine the torque of the power unit; an electric switch controlling the connection of the motor-generator with supply lines; and means connected with the stator and operable by rotation thereof incidental to dropping of the weighted beam as when the driving force of the power source depreciates below a predetermined value for opening said switch to disconnect the motor-generator from the supply lines.

5. In a dynamometer for testing internal combustion engines: a motor-generator connectible with electric supply lines; a support for the motor-generator mounting the same in a manner permitting bodily oscillation thereof about the axis of its rotor; a weighted scale beam connected with the stator of the motor-generator and tending to turn the same in one direction, operation of the motor-generator upon connection thereof to a supply line likewise tending to turn the stator in said direction through the reactive torque between its rotor and stator; means for drivingly connecting the rotor of the motor-generator with the drive shaft of an internal combustion engine in such a manner that the motor-generator can be used to drive the engine and vice versa, and whereby the stator of the motor-generator is turned in a direction opposed to the effect of the weighted beam whenever the speed of the engine exceeds synchronism with the motor-generator; an electric switch for controlling the connection of the motor-generator with the supply lines; and means for opening said switch when the stator of the motor-generator turns in its first designated direction so that the motor-generator is automatically disconnected from the supply lines upon failure of the engine.

6. In a dynamometer of the character described: a motor-generator; means mounting the motor-generator for bodily oscillation about its rotor axis and with the rotor axis substantially horizontal; a scale beam extending laterally from the stator of the motor-generator; a weight movable along the scale beam, said weighted scale beam applying a turning moment to the motor-generator in one direction about the axis of its rotor and tending at all times to bring the same to a predetermined position of rotation; an electric switch having an actuator; means mounting the switch adjacent to the motor-generator; and means on the motor-generator stator connectible with the actuator of the switch and operable by movement of the stator produced by the weighted scale beam to move the actuator of the switch in one direction.

7. In a dynamometer of the character described: a motor-generator; means mounting the motor-generator for bodily oscillation about its rotor axis and with its rotor axis substantially horizontal; a scale beam projecting from one side of the motor-generator stator and fixed thereto so as to tend to turn the stator in one direction to a predetermined position; a dashpot connected with the motor-generator to dampen oscillatory movement of its stator; and an electric switch operable by the oscillation of the motor-generator stator.

8. In a dynamometer of the character described: a motor-generator; means mounting the motor-generator for bodily oscillation about its rotor axis and with its rotor axis substantially horizontal; a scale beam projecting from one side of the motor-generator stator and fixed thereto so as to tend to turn the stator in one direction; a dashpot connected with the motor-generator to dampen oscillatory movement of its stator; an electric switch operable by the oscillation of the motor-generator stator; and electric circuit means connected with said switch for controlling the connection of the motor-generator with supply lines in such a manner that the maintenance of the switch in one of its positions is required to keep the motor-generator connected with the supply lines, and whereby actuation of the switch by oscillation of the motor-generator serves to disconnect the motor-generator from the supply lines.

9. In combination, a dynamometer for testing an internal combustion engine comprising a motor-generator having a rotor and a stator; an internal combustion engine drivingly connected with the rotor of the motor-generator whereby the engine may be driven from the motor-generator and vice versa so that the motor-generator functions as a generator whenever the speed of the engine operating under its own power exceeds synchronism; a support mounting the motor-generator in a manner permitting bodily oscillation of its stator about its axis as a result of the torque between the rotor and the stator; means for opposing turning of the stator on its axis in the direction it tends to turn when the motor-generator functions as a generator; means for connecting the motor-generator with supply lines so that the E. M. F. generated thereby when the engine drives the same is dissipated onto the supply lines; and means operable upon reduction in speed of the engine below synchronism for disconnecting the motor-generator from the supply lines.

JOHN W. FITZ GERALD.